US006869367B2

(12) United States Patent
Herdin et al.

(10) Patent No.: US 6,869,367 B2
(45) Date of Patent: Mar. 22, 2005

(54) ENGINE-GENERATOR ARRANGEMENT

(75) Inventors: Günther Herdin, Jenbach (AT); Manfred Maderböck, Wiesing (TW); Diethard Plohberger, Jenbach (AT); Erich Messner, Jenbach (AT)

(73) Assignee: Jenbacher Aktiengesellschaft, Jenbach (AU)

(*) Notice: Subject to any disclaimer, the term of this patent is extended or adjusted under 35 U.S.C. 154(b) by 0 days.

(21) Appl. No.: 09/765,518

(22) Filed: Jan. 19, 2001

(65) Prior Publication Data

US 2001/0008343 A1 Jul. 19, 2001

(30) Foreign Application Priority Data

Jan. 19, 2000 (AT) ............................................ A 80/2000

(51) Int. Cl.[7] ............................. F01B 23/10; F16D 3/84
(52) U.S. Cl. ...................... 464/177; 290/1 A; 310/51
(58) Field of Search .......................... 290/40 A–40 C, 290/52, 42, 1 A; 464/51–53, 177, 185; 310/51, 89; 403/221, 225

(56) References Cited

U.S. PATENT DOCUMENTS

| | | | | |
|---|---|---|---|---|
| 1,522,612 A | * | 1/1925 | Burchett ................... | 290/40 A |
| 1,972,441 A | * | 9/1934 | Gosslau ..................... | 290/1 |
| 2,928,961 A | * | 3/1960 | Morril ....................... | 248/638 |
| 3,330,515 A | * | 7/1967 | Janssen et al. ............. | 248/638 |
| 3,622,821 A | * | 11/1971 | Maffey, Jr. ................. | 310/43 |
| 3,893,775 A | * | 7/1975 | Sievers et al. ............. | 403/225 |
| 4,425,813 A | * | 1/1984 | Wadensten ................ | 248/635 |
| 4,561,532 A | * | 12/1985 | Knodel ...................... | 74/574 |
| 4,622,923 A | * | 11/1986 | Nishimura et al. ......... | 123/2 |
| 4,648,579 A | * | 3/1987 | Wilson ...................... | 248/638 |
| 4,819,503 A | * | 4/1989 | Fazi, Jr. et al. ............ | 74/574 |
| 4,866,294 A | * | 9/1989 | Johnston et al. .......... | 290/38 R |
| 5,126,607 A | * | 6/1992 | Merriman, Jr. ............ | 310/51 |
| 5,354,182 A | * | 10/1994 | Niemiec et al. ........... | 417/363 |
| 6,278,196 B1 | * | 8/2001 | Ehrhart et al. ............ | 290/40 |

FOREIGN PATENT DOCUMENTS

| | | |
|---|---|---|
| DE | 33 34 429 A1 | 4/1985 |
| DE | 42 34 920 A1 | 4/1994 |
| EP | 0 278 931 A2 | 8/1988 |

* cited by examiner

Primary Examiner—Kenn Thompson
(74) Attorney, Agent, or Firm—Lorusso Loud & Kelly LLP

(57) ABSTRACT

An engine-generator arrangement comprising an internal combustion engine whose output shaft is connected to the drive shaft of the generator by way of an elastic coupling, wherein the engine casing of the internal combustion engine is connected elastically and preferably rubber-elastically to the generator casing of the generator.

14 Claims, 2 Drawing Sheets

PRIOR ART

ENGINE-GENERATOR ARRANGEMENT

BACKGROUND OF THE INVENTION

1. Field of the Invention

The invention concerns an engine-generator arrangement comprising an internal combustion engine whose output shaft is connected to the drive shaft of the generator by way of an elastic coupling.

Engine-generator arrangements of that kind are used for example as modules for block heating and generating plants. The elastic coupling makes it possible to achieve rotational elasticity to compensate for shock torque loadings and damping of rotational oscillations as well as radial elasticity to compensate for shaft misalignments.

2. Description of the Related Art

The state of the art includes a structure as is shown in FIG. 1. The output shaft 2 of the internal combustion engine 1 is connected by way of an elastic coupling to the drive shaft 4 of the generator 5. The engine casing 6 of the internal combustion engine 1 is rigidly connected by way of connecting members 7 to the generator casing 8 of the generator 5. The entire engine-generator arrangement is elastically supported on the ground 9. That design configuration does not require accurate orientation of the internal combustion engine 1 with respect to the generator 5. A disadvantage with this structure however is the transmission of vibration by way of the rigid intermediate members, which can adversely affect and ultimately ruin the generator 5.

For that reason, the attempt has already been made in the state of the art to omit those rigid couplings, as is shown by the alternative structures in FIGS. 2 and 3 relating to the state of the art. In the case of the structure shown in FIG. 2 the internal combustion engine 1 and the generator 5 are fixed on a foundation 10 which in turn rests elastically on the ground 9.

A similar structure is shown in FIG. 3 in which the internal combustion engine 1 and the generator 5 are fixed on a common stiff frame 11 which rests elastically on the ground 9.

A disadvantage with the structures shown in FIGS. 2 and 3 is the fact that such foundations or rigid frames for carrying the torque forces are structurally more complicated and expensive.

SUMMARY OF THE INVENTION

Therefore the object of the present invention is to provide an improved engine-generator arrangement which avoids the disadvantages of the state of the art.

In accordance with the invention that is achieved in that the engine casing of the internal combustion engine is connected elastically and preferably rubber-elastically to the generator casing of the generator. The required moments can be reliably transmitted between the engine casing and the generator casing by way of such a preferably rubber-elastic or resilient connection between the engine casing and the generator casing, but at the same time it is also possible to provide for vibration decoupling between the internal combustion engine and the generator, whereby the generator remains protected from engine vibrations. In addition, by virtue of such a coupling which for example is in the form of a rubber-elastic, flexible intermediate layer, it is possible to avoid expensive common torque-transmitting frames or foundations.

An embodiment which is preferred from the structural point of view provides that mounted to the engine casing is a first annular flange which is arranged substantially around the output shaft, that mounted to the generator casing is a second annular flange which is arranged substantially around the drive shaft, and that the two annular flanges are connected together by way of at least one elastic intermediate member, wherein the elastic intermediate member desirably has a rubber-elastic elastomer layer.

The vibration decoupling effect between the internal combustion engine and the generator can however in principle be effected structurally in many different ways, preferably between elastomer elements, so that the vibrations from the engine are not passed to the generator. Design configurations as are already known per se in relation to elastic shaft couplings (pin couplings, dog couplings, bead or flange couplings, intermediate ring couplings, etc) are basically suitable.

DESCRIPTION OF THE DRAWINGS

The invention is described in greater detail with reference to the description hereinafter of the drawings.

FIG. 5 shows a detail of the elastic coupling between the engine casing and the generator casing.

DESCRIPTION OF THE INVENTION

Figure 4:
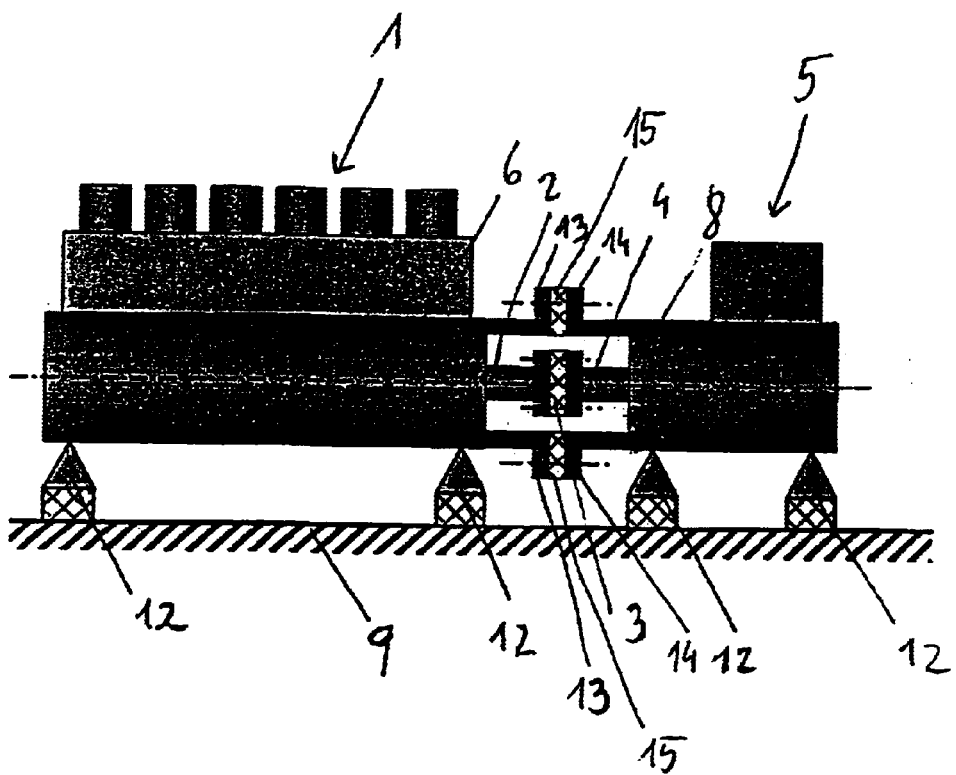
FIG. 4 shows an embodiment of an engine arrangement according to the invention.

In the embodiment according to the invention as shown in FIG. 4, the internal combustion engine 1 drives by way of an output shaft 2 the drive shaft 4 of a generator 5. Both the internal combustion engine 1 and also the generator 5 are supported on the ground 9 by way of simple rubber-mounted supports 12. A rotationally and radially elastic coupling connects the output shaft 2 to the drive shaft 4.

Now, in accordance with the invention, it is provided that the engine casing 6 is connected elastically and preferably resiliently or rubber-elastically to the generator casing 8.

For that purpose, in the embodiment shown in FIG. 4, arranged on the engine casing 6 substantially around the output shaft 2 is a first annular flange 13. A second annular flange 14 is arranged around the generator casing 8, substantially around the drive shaft 4. Now, in accordance with the invention, the two annular flanges 13 and 14 are connected together rubber-elastically and with vibration decoupling, by way of an elastic intermediate member 15.

FIG. 5 shows in detail that elastic flexible coupling by means of a rubber-elastic elastomer layer 15.

The elastomer layer 15 is mounted on a steel core 16 and surrounded by a sleeve 17. The flange 13 of the engine casing 6 and the flange 14 of the generator casing 8 are connected by way of the screw 18 with nut 19, wherein in accordance with the invention the screw 18 is elastically supported in the elastomer layer 15. Overall a plurality of such elastically supported screws are distributed around the periphery of the flanges 13 and 14.

Figure 1:
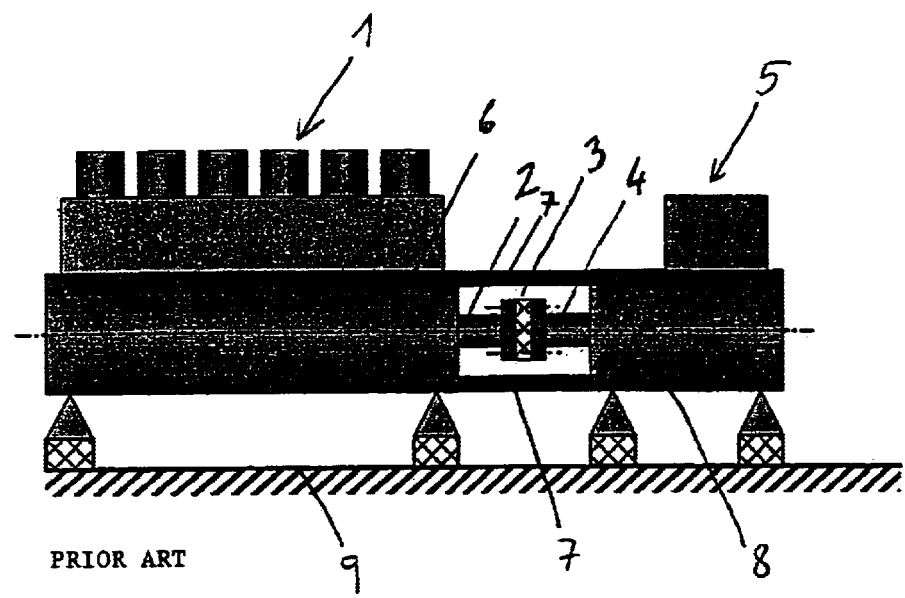
FIGS. 1 to 3 which have already been described show engine-generator arrangements in accordance with the state of the art.
Figure 2:
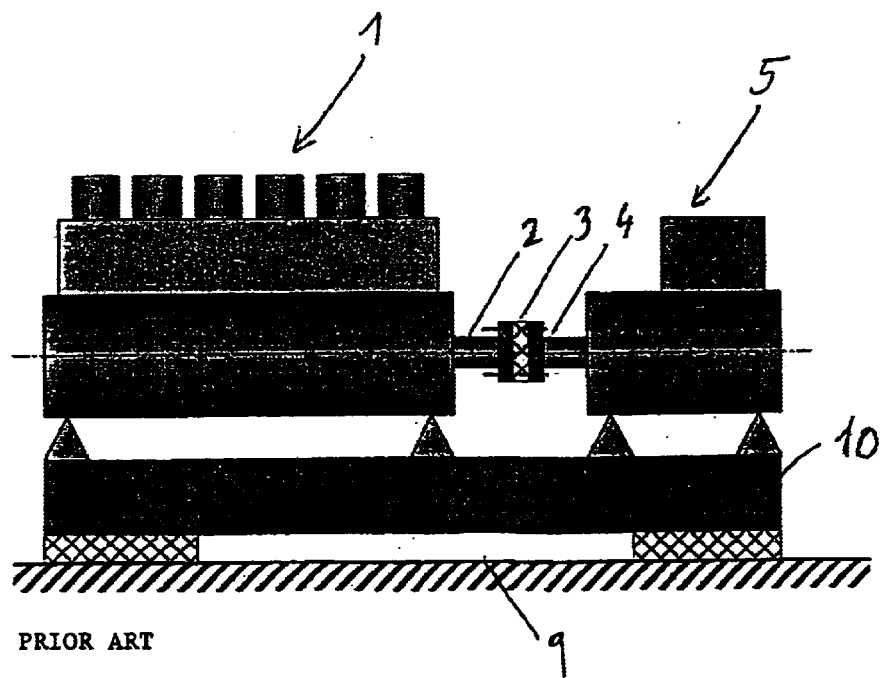
Figure 3:
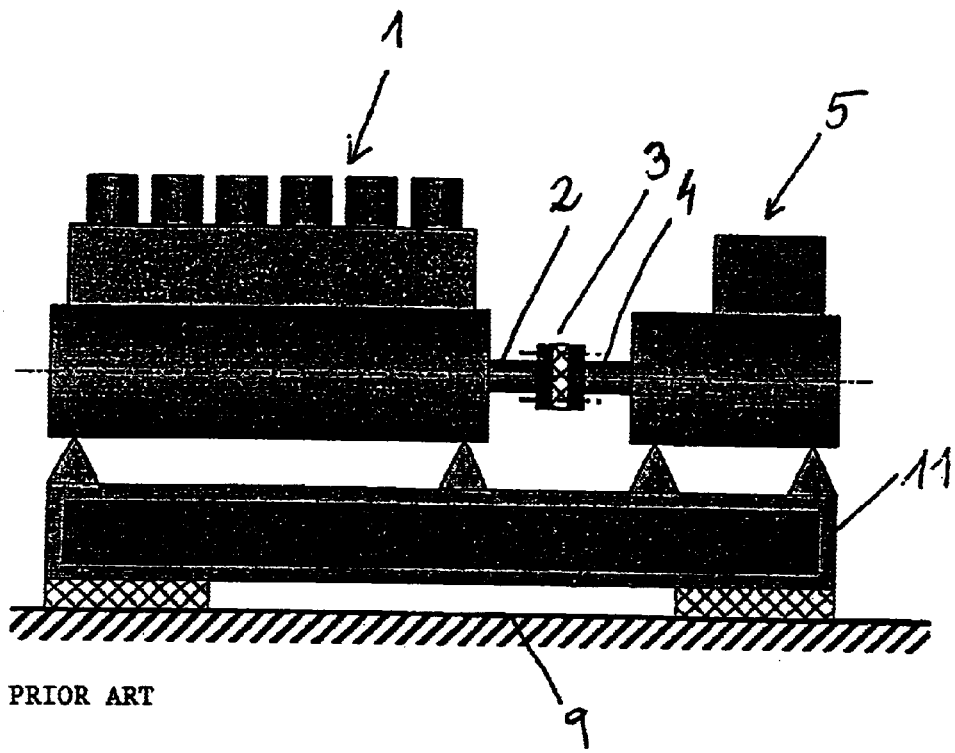

It will be appreciated that the invention is not limited to the illustrated embodiments. There are numerous structural options of implementing the elastic coupling according to the invention between the engine casing and the generator casing. The essential consideration in that respect is that this connection on the one hand must be capable of transmitting the required torques and in so doing preferably keeping any shaft angle displacement at a minimum, while on the other hand, preferably using elastomeric materials, it is such that it does not transmit vibration from the internal combustion engine to the generator or transmits such vibration only in a severely damped manner, thereby protecting the generator from vibration-induced damage. In this arrangement, it is possible to avoid a complicated and expensive foundation or frame structure, as is provided in the state of the art shown in FIGS. 2 and 3.

What is claimed is:

1. An engine-generator arrangement comprising:

an internal combustion engine with an output shaft and an engine casing and an electric generator for producing electricity; said electric generator comprising a drive shaft and a generator casing, wherein said output shaft of said internal combustion engine is connected to said drive shaft of said electric generator by way of an elastic coupling and wherein said engine casing is connected to said generator casing by way of at least one elastic intermediate member and wherein said internal combustion engine and said generator are supported by way of rubber-mounted supports to avoid the transmission of omnidirectional vibrations from said internal combustion engine to said generator.

2. The engine-generator arrangement according to claim 1 wherein said elastic intermediate member comprises a rubber-elastic elastomer layer.

3. The engine-generator arrangement according to claim 1 further comprising a core wherein the at least one elastic intermediate member is annular and the core is disposed in the at least one elastic intermediate member.

4. The engine-generator arrangement according to claim 3 further comprising a fastener assembly for securing the first flange to the second flange with the at least one elastic intermediate member.

5. The engine-generator arrangement according to claim 4 wherein the fastener assembly comprising a bolt and a nut wherein the core has a bore and the bolt is disposed in the core.

6. The engine-generator arrangement according to claim 5 further comprising a sleeve surrounding the at least one elastic intermediate member.

7. The engine-generator arrangement according to claim 6 wherein the second flange has portions comprising a second bore for receiving the sleeve wherein the sleeve interfaces with the second flange via the portions defining the bore.

8. The engine-generator arrangement according to claim 1 wherein the engine casing comprises a first flange having a bore wherein the at least one elastic intermediate member is disposed in the bore;

the generator casing comprising a second flange substantially radially coextensive with and aligned with the first flange in a substantially non-overlapping substantially parallel orientation wherein the first flange is attached to the second flange via the elastic intermediate member.

9. The engine-generator arrangement according to claim 1 further comprising a core disposed between the at least one elastomeric intermediate member and the second flange.

10. The engine-generator arrangement according to claim 9 further comprising a fastener assembly for securing the first flange to the second flange with the at least one elastomeric intermediate member.

11. The engine-generator arrangement according to claim 10 wherein the fastener assembly comprising a bolt and a nut wherein the core has a bore and the bolt is disposed in the core.

12. The engine-generator arrangement according to claim 11 further comprising a sleeve surrounding the at least one elastomeric intermediate member.

13. The engine-generator arrangement according to claim 12 wherein the second flange has portions comprising a second bore for receiving the sleeve wherein the sleeve interfaces with the second flange via the portions defining the bore.

14. The engine-generator arrangement according to claim 1 wherein said internal combustion engine and said generator are supported on the ground by way of said rubber-mounted supports.

* * * * *